Aug. 23, 1932.                R. G. McLEOD                1,873,003
           VEHICLE DIRECTION AND MOVEMENT SIGNALING DEVICE
                   Filed Feb. 13, 1930        3 Sheets-Sheet 1
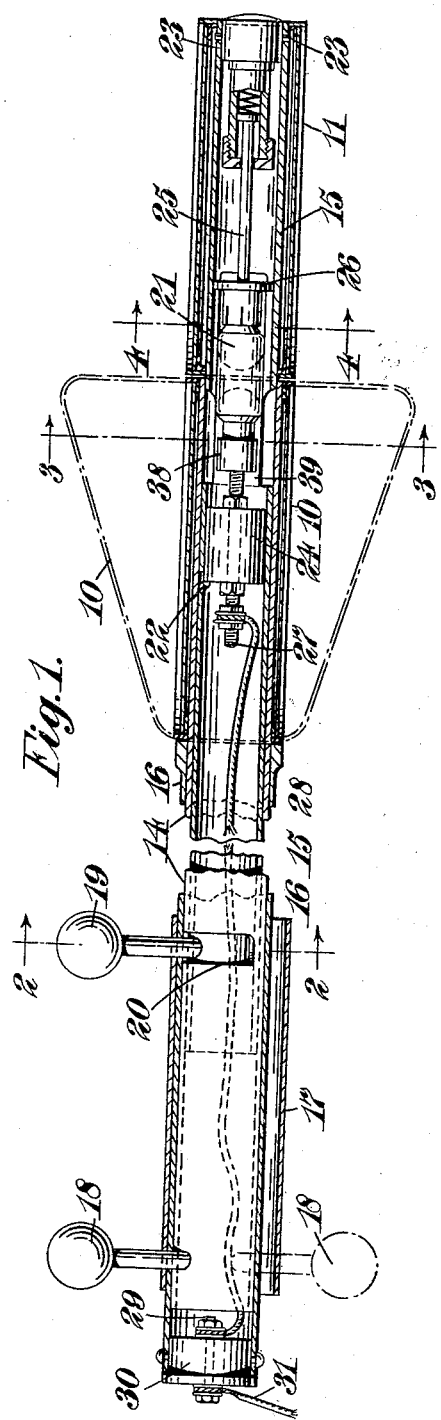
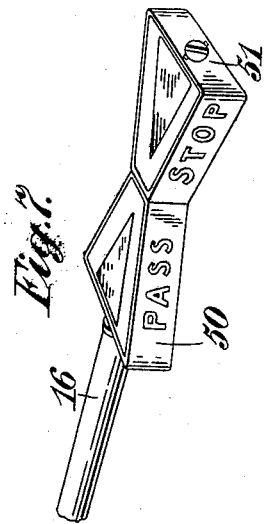
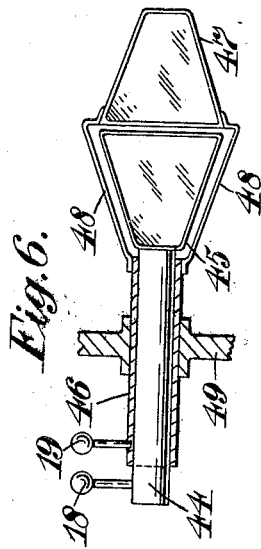
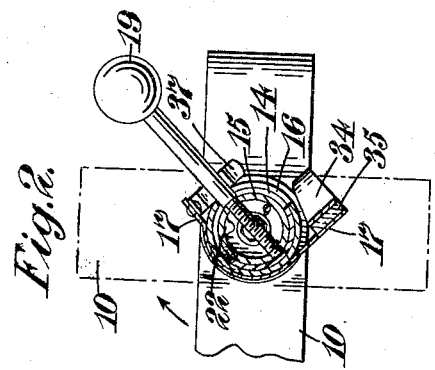
INVENTOR
Roderick G. McLeod
by
Byrnes, Stebbins, Parmelee + Blenko
Attys.

Aug. 23, 1932.   R. G. McLEOD   1,873,003
VEHICLE DIRECTION AND MOVEMENT SIGNALING DEVICE
Filed Feb. 13, 1930   3 Sheets-Sheet 2
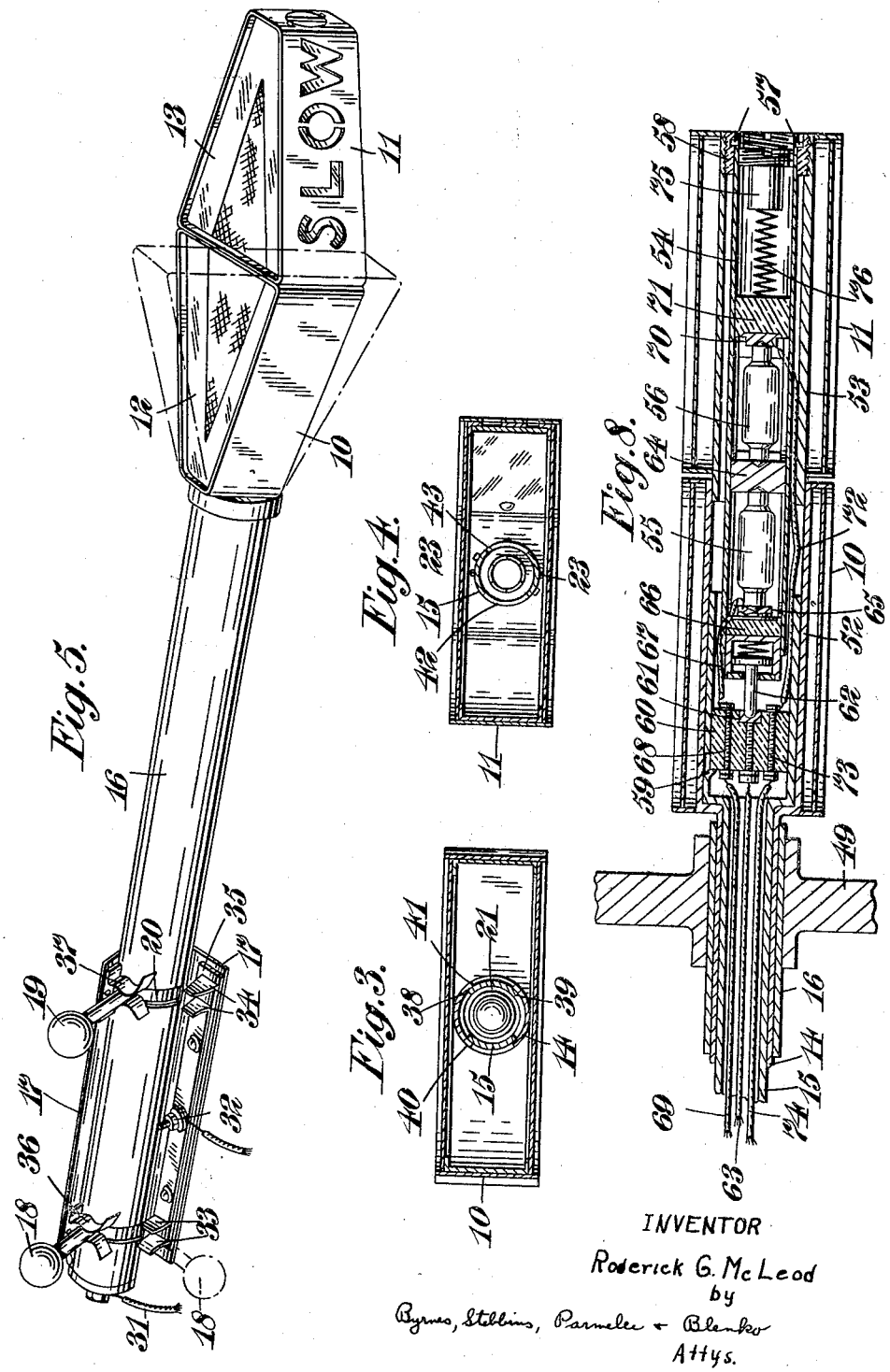
INVENTOR
Roderick G. McLeod
by
Byrnes, Stebbins, Parmelee & Blenko
Attys.

Aug. 23, 1932.     R. G. McLEOD     1,873,003
VEHICLE DIRECTION AND MOVEMENT SIGNALING DEVICE
Filed Feb. 13, 1930    3 Sheets-Sheet 3

INVENTOR
Roderick G. McLeod
by
Byrnes, Stebbins, Parmelee + Blenko
Att'ys.

Patented Aug. 23, 1932

1,873,003

UNITED STATES PATENT OFFICE

RODERICK GEORGE McLEOD, OF LONDON, ENGLAND

VEHICLE DIRECTION AND MOVEMENT SIGNALING DEVICE

Application filed February 13, 1930, Serial No. 428,105, and in Great Britain February 18, 1929.

This invention is for improvements in or relating to road traffic direction and movement signaling devices for use on vehicles, and has for one of its objects to provide a device which will readily attract the attention of any one situated at the front or rear of the vehicle, and when not in use will not obstruct the view of the driver of the vehicle. It is also an object of the invention to provide a construction which is simple to operate and cheap to manufacture.

According to the primary feature of the present invention, there is provided a signaling device comprising a plurality of indicators adapted to be rotated about a horizontal axis from a horizontal inoperative position into a vertical operative position, which indicators have independent operating stems which are nested together to turn about a common axis. Thus it will be seen that a very compact arrangement of the operating stems is provided so as to minimize obstruction of the driver's view.

Conveniently, each indicator is so dimensioned that one of its faces is small and the other comparatively large. That is to say, the indicators are thin so that when they are in their horizontal inoperative position they will not obstruct the driver's view.

The indicators may be located in various positions but in the preferred construction they are located at the same side of the vehicle and there may be any convenient number of indicators in a set.

It is a feature of the invention to arrange the stems to reach to a position adjacent to the driver's seat and to have control arms for hand manipulation by the driver. Usually the control arms would be located in front of the driver adjacent to the windscreen, and in one construction according to the invention the axis about which the stems are rotated is coincident with the axis about which the windscreen hinges. This arrangement, it will be appreciated, reduces the obstruction of the driver's view to an absolute minimum.

The aforesaid control arms for the stems may conveniently be arranged in such a manner that the one controlling the indicator for movements to the "right" is located at the right hand side of the arm controlling the indicator for movements to the "left." This will render it easy for the driver to give the proper indications.

For night driving it is desirable that the indicators shall be illuminated, but as during the greater part of the time that the vehicle is travelling the indicators will be inoperative, it is desirable to have means for switching off the illumination when the indicators are not in use. For this purpose it is a feature of the invention to employ the rotation of the stems to control the electric switches for lights in the indicators.

For a more complete understanding of these and other features of the invention, there will now be described, by way of example only, and with reference to the accompanying drawings, certain constructional forms of signaling device according to the invention. It is to be understood, however, that the invention is not restricted to the precise constructional details set forth.

In these drawings—

Figure 1 is an elevation in longitudinal section of one form of signaling device according to the invention;

Figure 2 is a section on the line 2—2 of Figure 1;

Figure 3 is a section on the line 3—3 of Figure 1;

Figure 4 is a section on the line 4—4 of Figure 1;

Figure 5 is a perspective view of the construction shown in Figures 1 to 4;

Figure 6 is an elevation, partly in section, of a modified form of signaling device on a scale smaller than that of Figures 1 to 5;

Figure 7 is a perspective view on a scale similar to that of Figure 6, but showing another modified construction;

Figure 8 is a sectional elevation corresponding to Figure 1, but showing another modified construction;

Like reference numerals indicate like parts throughout the drawings.

Figure 9:
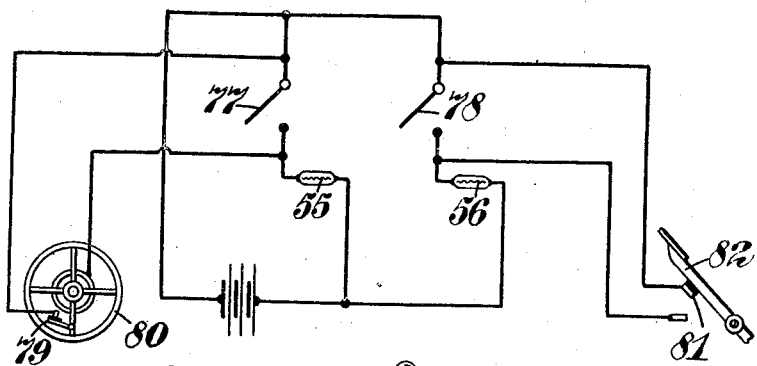
Figure 9 is a wiring diagram applicable to the construction shown in Figure 8.

Referring firstly to the construction shown in Figures 1 to 5, there is shown therein a construction embodying two indicators, one for indicating turns to the right and the other for indicating turns to the left, for which purpose the indicators have arrowheads or pointers directed in the appropriate direction. Each indicator comprises a metal casing 10 and 11, respectively, of substantially triangular shape. One or both triangular faces of each indicator is closed by a transparent or translucent sheet having upon it a displayed arrowhead 12 and 13 the former pointing to the left, and the latter to the right. The indicator 10 is carried by a tubular stem 14, and the indicator 11 by a similar stem 15 which is nested in the stem 14. These two stems are enclosed by an outer casing 16, also of tubular shape, which is intended to be mounted on the vehicle. For instance, it may be received in a tube forming part, say, of the hinge of the windscreen of a motor-car. Secured to the tube 16 is a bracket 17 for a purpose to be indicated hereinafter. The ends of the stems 14 and 15 are intended to reach to a position close to the driver, and they are provided with control arms 18 and 19, the tube 16 being slotted to accommodate the arm 18 and the tubes 14 and 16 being slotted to accommodate the arm 19, one of the slots being indicated at 20 in Figure 1. Thus it will be seen that by manipulating the arms 18 and 19 the driver of the vehicle can rotate the indicators 10 and 11. As seen in Figures 1, 2 and 5, both indicators are shown in full lines in their horizontal or inoperative positions, and there is shown in chain lines the operative position of the indicator 10. The indicators are independently rotatable, and only one will be in the vertical or operative position at a time, while the other will remain horizontal, and thus will not be visible to persons in front or behind the vehicle, and, moreover, will not be in a position to obstruct the driver's view, since the indicators are thin as measured between their parallel triangular faces. When the indicators are in their vertical position, the arrowhead will indicate the direction in which the vehicle is to turn, and according as to whether two opposite sides or only one side of the indicator bear the arrowhead, so the indication will be observed either from the front and rear of the vehicle, or from only one of these positions. It will be seen that the indicator 10 for indicating turns to the left is controlled by the left-hand control arm 18 and the indicator 11 for indicating turns to the right is controlled by the right-hand control arm 19, which is a desirable arrangement for assisting the operation of the device by the driver.

The stem 14 extends from the tube 16 to the remote end of the indicator 10, and the stem 15 extends from the tube 16 through the indicator 10 to the remote end of the indicator 11, and its interior is employed to house an electric lamp for the purpose of illuminating the indicators either only at night or at all times, as may be preferred. The lamp bulb 21 is intended to be passed into the interior of the stem 15 through the right-hand end thereof, as seen in Figure 1, and in the construction illustrated, it is mounted in a form of cartridge which at one end bears against an inturned lug 22 formed in the stem 15 at such a position that the other end of the cartridge is flush with the end of the indicator 11. This end of the cartridge is formed with pins 23 to be received after the fashion of a bayonet joint in the end of the stem 15. Conveniently, the lamp bulb cartridge comprises an insulating block 24 which assists to centre the cartridge in the stem 15, and a spring plunger 25 which co-operates with the bayonet joint to maintain the cartridge in place. The cartridge also comprises a metal flange 26 which bears against the interior of the stem 15, and serves to connect the latter electrically to one terminal of the lamp filament. The other terminal is connected to a screwed stud 27 which is connected by an insulated wire 28 to a stud 29 at the left-hand end of the tube 16. This stud 29 is carried in an insulating block 30 which closes the end of the tube 16, and an insulated wire 31 extends, via battery terminals, not shown, from the outer end of the stud 29 to a terminal 32 which is in electrical connection with two pairs of spring contacts 33 and 34. The contacts 33 are appropriated to the control arm 18 and the contacts 34 are appropriated to the control arm 18, and when either of these control arms is in engagement with its associated spring contacts, the circuit through the lamp will be completed. The terminal 32 and the contacts 33 and 34 are mounted upon an insulating strip 35 carried by the aforesaid bracket 17. The latter also carries spring clips 36 and 37 which constitute locating devices to tend to retain the stems and their indicators in the inoperative setting. While it will be easy for the driver to move them out of that position intentionally, the clips 36 and 37 will resist any undesired movement. For instance, the movement of one of the indicator stems might, through friction, tend to move the other, which would, of course, be undesirable, and the spring clips will tend to prevent this.

Referring to Figures 1 and 3, it will be seen that the innermost stem 15 is cut away in the interior of the indicator 10 at positions 38 and 39 opposite to the lamp bulb 21. It will also be seen from Figure 3, that the stem 14 is likewise cut away opposite to the lamp bulb 21 at positions 40 and 41. The cutaway portions 38, 39, 40 and 41 are so located that when the indicator 11 is horizontal, and the indicator 10 is vertical, light will be able to pass from the lamp 21 into the interior of the indicator 10 around the outside of the stem 14, and, consequently, the arrow-head or heads 12 will be illuminated, since the cut-away portions 38 and 39 will be in coincidence with the cut-away portions 40 and 41. For the purpose of illuminating the indicator 10 when it is vertical, the stem 15 is cut away inside the indicator 11 at positions 42 and 43 opposite to the lamp.

From the foregoing description, it will be appreciated that the rotation of the stems 14 and 15 is employed to control the lamp 21 since when the arms 18 and 19 are in engagement with the spring contacts 33 and 34, the lamp will be illuminated, and when the arms are taken out of those contacts, the light will be switched off.

The face of the indicator 11 which is directed towards the rear when the indicator is horizontal, may conveniently be employed to exhibit a notice or warning, such as the word "Slow", which may be formed by perforations in the casing of the indicator. To display this notice at appropriate times, the lamp 21 may also have its circuit controlled by brake-operated or other switches independent of the rotation of the stems of the indicators. Thus, for instance, the arrangement may be adopted that the lamp 21 is illuminated whenever the brake is applied. A suitable arrangement would be to have the brake-operated switch and the indicator stem operated switch in parallel, as has been illustrated for example in Figure 9 in connection with another form of the invention.

In the construction shown in Figures 1 to 5, the inner stem 15 is appropriated to the outer indicator 11. Figure 6 illustrates a construction in which an inner stem 44 is appropriated to an inner indicator 45, and an outer stem 46 is appropriated to an indicator 47 which is further from the vehicle than is the indicator 45. The stem 46 is connected to the indicator 47 by an exterior coupling reaching around the indicator 45, this coupling being in the form of a skeleton framework 48 of very light construction, so as not to appear unsightly or obscure the driver's view. This framework 48 conforms fairly closely to the contour of the indicator 45, so that all the parts will lie compactly together when the indicators are in their inoperative setting. In this arrangement, as in the arrangement shown in Figures 1 to 5, the stems 44 and 46 have control arms 18 and 19 whereof the one controlling the indicator for movements to the "right" is located on the right-hand side of the arm controlling the indicator for movements to the "left." In the arrangement shown in Figure 6, there is no need for the stem 46 to be prolonged so far as to encompass the arm 18. Consequently, there is no need for a circumferential slot to be cut in the stem 46. Figure 6 shows the indicator stems carried in a support 49 which may be part of a windscreen pillar or part of a door or may be some other element on the vehicle.

In the construction illustrated in Figures 1 to 5, the left-hand indicator 10 is for indicating turns to the left, and the right-hand indicator 11 is for indicating turns to the right. Figure 7 shows a construction in which this arrangement is varied, since the left-hand indicator 50 shown in Figure 7 is for indicating turns to the right, and the right-hand indicator 51 is for indicating turns to the left. In this construction certain of the narrow faces of both indicators which are vertical when the indicators are in their inoperative position, are provided with notices, the suggestion being that in some circumstances it will be convenient that the indicator 50 should bear the word "Pass" and the indicator 51 the word "Stop." The intention is that these words shall be illuminated by the lamp 21, so that when the indicator 50 is in operative position, showing that the vehicle is to turn to the right, the indicator 51 will simultaneously warn vehicles to the rear to stop, and likewise, when the indicator 51 is in operative position, indicating that the vehicle is to turn to the left, the indicator 50 will inform the drivers of following vehicles that they may pass.

Referring now to Figure 8, two indicators 10 and 11 are shown therein whereof the indicator 10 is carried upon an enlarged extension 52 from a stem 14, and the indicator 11 is carried upon an enlarged extension 53 from a stem 15. The extensions 52 and 53 are tubular, and, by having them of larger diameter than the stems to which they are connected, or of which they form part, it is possible to provide adequate room for the illuminating devices for the indicators, and, at the same time, to have the nested stems carried in a support on the vehicle of comparatively small diameter. The outer stem 14 is received in a tube 16 carried by a support 49.

Inside the tubular extension 53 there is received a metal cartridge 54 containing two lamp bulbs 55 and 56 appropriated respectively to the indicators 10 and 11. The cartridge 54 has pins 57 by which the cartridge is secured with a bayonet joint in an insulating bush 58 screwed into the outer end of the tubular extension 53. At the other end of the tubular extension 53 there is formed an inturned lug 59 which constitutes a stop for an insulating block 60. This block 60 has a contact piece 61 against which a spring plunger 62 carried by the cartridge 54 bears. By this means, a lead 63 is placed in electrical communication with the cartridge casing.

At about the middle of the length of the cartridge, there is a metal block 64 which is in contact with the cartridge casing and against which one end of each of the lamps 55 and 56 bears. Thus the lead 63 is in communication with one end of the filament in each lamp. The other end of the lamp 55 bears against a contact piece 65 carried by an insulating block 66 in the interior of the cartridge. This contact piece 65 is connected by a lead 67 to a stud 68 carried by the block 60, and a lead 69 extends from the stud 68. The outer end of the lamp 56 bears against a contact piece 70 carried by an insulating block 71 and connected by a lead 72 to a stud 73 extending through the block 60. A lead 74 is also connected to the stud 73. In this way the lead 63 is connected to one end of both lamp filaments and the leads 69 and 74 are each connected to one end of one of the filaments. The various parts are maintained in place in the cartridge by an end cap 75 and a spring 76.

The lamp 55 is intended solely for the purpose of illuminating the indicator 10 and is quite shut off from the interior of the indicator 11. Similarly the lamp 56 is solely concerned with illuminating the indicator 11. It will be understood that the tubular extensions 52 and 53 are slotted in order to permit of the passage of light from the lamps to the surface of the indicators. The lamps are controlled by switches constituted by control arms 18 and 19, as illustrated in the preceding figures, and it will be understood that when the one control arm 18 is brought into engagement with its switch contacts, one lamp will be illuminated, and when the other control arm is brought into engagement with its switch contacts, the other lamp will be illuminated. In Figure 9 the switches constituted by the arms 18 and 19 are numbered 77 and 78, and in parallel with the switch 77 is another switch 79 which is shown as being mounted for manual operation on the steering wheel 80 of the vehicle. In parallel with the switch 78 is another switch 81 operated by the brake pedal 82. These switches 79 and 81 are intended to be supplied if it is desired that the lamps shall be employed to illuminate notices on those faces of the indicators which are vertical when the indicators are in their inoperative position. For example, notices such as "Slow", "Pass", "Stop".

Figure 10:
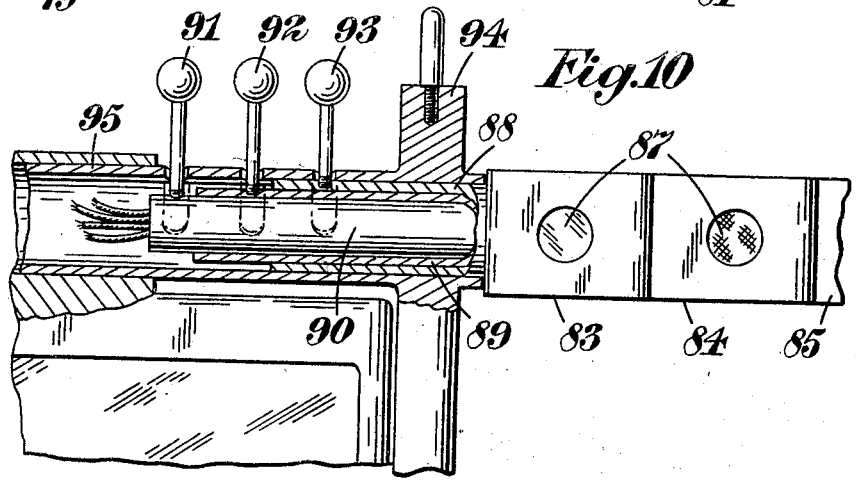
Figure 10 is an elevation, partly in section, showing one form of signaling device according to the invention fitted to the windscreen of a motor-car.
Figure 11:
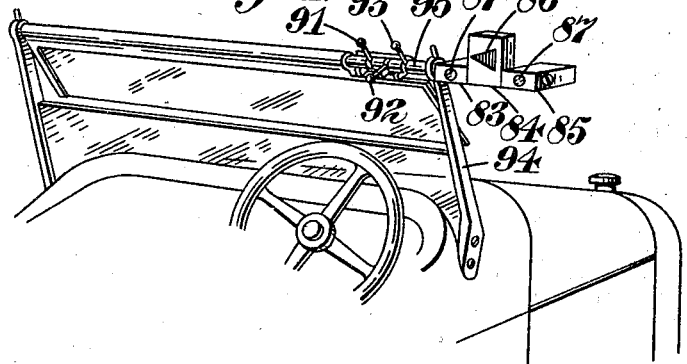
Figure 11 is a perspective view of the construction shown in Figure 10.

Figures 10 and 11 illustrate a construction wherein more than two indicators are provided, three being shown, 83, 84, 85. These indicators are of rectangular formation, and the axis about which they pivot is located towards one of their ends. That is to say, they are not pivoted symmetrically. In their operative positions, any suitable notices may be exhibited, as, for instance, the arrowhead 86, and in their inoperative positions other notices, such as the circles 87, may be exhibited, which may, for instance, be of different colours if in the future some definite scheme of traffic regulation should be adopted based upon the employment of different colours. The indicators 83, 84 and 85 have nested stems 88, 89 and 90 operated by control arms 91, 92 and 93. The nested stems are received in a windscreen standard 94 and a tubular extension 95 therefrom, but it will be appreciated that any other suitable way may be adopted of mounting the nested stems of the indicators.

It is to be understood that the invention is not restricted to the precise constructional details set forth.

I claim.

1. A road traffic direction and movement signaling device for use on vehicles, comprising a plurality of indicators adapted to be rotated about a horizontal axis each from an inoperative position wherein an indicating face is in a horizontal plane into an operative position wherein said indicating face is in a vertical plane, and independent operating stems for said indicators which operating stems are rotatably nested together.

2. A road traffic direction and movement signaling device for use on vehicles, comprising a plurality of indicators adapted to be rotated about a horizontal axis lying in the general plane of each of said indicators from a horizontal inoperative position into a vertical operative position, and independent operating stems for said indicators which operating stems are rotatably nested together.

3. A road traffic direction and movement signaling device for use on vehicles, comprising a plurality of indicators, a small and a comparatively large face on each of said indicators, with said indicators adapted to be rotated about a horizontal axis each from a horizontal inoperative position in which the said small face is exhibited into a vertical operative position in which the said comparatively large face is exhibited, and independent operating stems for said indicators which operating stems are rotatably nested together.

4. A road traffic direction and movement signaling device for use on vehicles, comprising a plurality of indicators adapted to be rotated about a horizontal axis each from an inoperative position wherein an operative face is in a horizontal plane into an operative position wherein said operative face is in a vertical plane, and independent operating stems on which said indicators are rotatably carried and which are nested together, which indicators are so dimensioned that in their inoperative positions they offer but small obstruction to the driver's view, namely, such faces of the indicators as are exhibited in this setting are much smaller than the operative faces that are exhibited in the vertical setting.

5. A road traffic direction and movement signaling device for use on vehicles, comprising a plurality of indicators located at the same side of the vehicle and adapted to be rotated about a horizontal axis each from an inoperative position wherein an indicating face is in a horizontal plane into an operative position wherein said indicating face is in a vertical plane, and independent operating stems for said indicators which operating stems are rotatably nested together.

6. A road traffic direction and movement signaling device for use on vehicles, comprising a plurality of indicators located at the same side of the vehicle and adapted to be rotated about a horizontal axis lying in the general plane of each of said indicators from a horizontal inoperative position into a vertical operative position, and independent operating stems for said indicators which operating stems are rotatably nested together.

7. A road traffic direction and movement signaling device for use on vehicles, comprising a plurality of indicators adapted to be rotated about a horizontal axis lying in the general plane of each of said indicators from a horizontal inoperative position into a vertical operative position, independent operating stems on which said indicators are carried and which are nested together to turn about the axis of the said indicators, and which stems reach to a position adjacent to the driver's seat, and a hand-manipulated control arm for at least one of said stems adapted to be operated by the driver.

8. A road traffic direction and movement signaling device for use on vehicles, comprising a plurality of indicators adapted to be rotated about a horizontal axis lying in the general plane of each of said indicators from a horizontal inoperative position into a vertical operative position, independent operating stems for said indicators, which operating stems are rotatably nested together, and a switch member moving with at least one of said stems.

9. A road traffic direction and movement signaling device for use on vehicles having hinged windscreens, comprising a plurality of indicators adapted to be rotated about a horizontal axis lying in the general plane of each of said indicators from a horizontal inoperative position into a vertical operative position, and independent operating stems for said indicators which operating stems are nested together to turn about an axis which is coincident with the axis about which the vehicle windscreen hinges.

10. A road traffic direction and movement signaling device for use on vehicles, comprising a plurality of indicators adapted to be rotated about a horizontal axis lying in the general plane of each of said indicators from a horizontal inoperative position into a vertical operative position, independent operating stems on which said indicators are carried and which are nested together to turn about the axis of the said indicators, and locating devices which tend to retain the stems and their indicators in the inoperative setting.

11. A road traffic direction and movement signaling device for use on vehicles, comprising two indicators located adjacent to each other at the same side of the vehicle and adapted to be rotated about a horizontal axis lying in the general plane of each of said indicators from a horizontal inoperative position into a vertical operative position, independent operating stems for said indicators which stems are rotatably nested together with the inner stem appropriated to the indicator furthest from the vehicle, and a connection between the inner stem and said indicator, which connection reaches through the interior of the other indicator.

12. A road traffic direction and movement signaling device for use on vehicles, comprising two indicators located adjacent to each other at the same side of the vehicle and adapted to be rotated about a horizontal axis lying in the general plane of each of said indicators from a horizontal inoperative position into a vertical operative position, independent operating stems for said indicators which stems are rotatably nested together with the outer stem appropriated to the indicator furthest from the vehicle, and a connection between the outer stem and said indicator which connection reaches around the exterior of the other indicator.

13. A road traffic direction and movement signaling device for use on vehicles, comprising a plurality of indicators adapted to be rotated about a horizontal axis lying in the general plane of each of said indicators from a horizontal inoperative position into a vertical operative position, independent operating stems on which said indicators are carried and which are nested together to turn about the axis of the said indicators, and a cartridge-like member arranged to be inserted into the indicators cartridge-fashion through at least one end of the axis about which the indicators are pivoted.

14. A road traffic direction and movement signaling device for use on vehicles, comprising a plurality of indicators adapted to be rotated about a horizontal axis each from an inoperative position wherein an indicating face is in a horizontal plane into an operative position wherein said indicating face is in a vertical plane, independent operating stems for said indicators, which stems are rotatably nested together, two alternative faces on at least one of said indicators, of which alternative faces one is exposed to view when the said indicator is in its operative position and the other is exposed to view when the indicator is in its inoperative position, and notices on said two alternative faces of said indicator.

15. A road traffic direction and movement signaling device for use on vehicles, comprising a plurality of indicators adapted to be rotated about a horizontal axis each from an inoperative position wherein an indicating face is in a horizontal plane into an operative position wherein said indicating face is in a vertical plane, independent operating stems for said indicators, which stems are nested together to turn about the axis of the indicators, and tubular supports upon which the indicators are mounted and which extend through the indicators and are each of larger diameter than the corresponding stem in the next to which they are connected.

In testimony whereof I affix my signature.

RODERICK GEORGE McLEOD.